(12) United States Patent
Pearson et al.

(10) Patent No.: US 11,166,874 B2
(45) Date of Patent: Nov. 9, 2021

(54) SYSTEM FOR PRODUCING A PACKAGED ITEM WITH AN IDENTIFIER

(71) Applicant: TruTag Technologies, Inc., Kapolei, HI (US)

(72) Inventors: Peter Pearson, Aptos, CA (US); Ting Zhou, Orinda, CA (US); Timothy Learmonth, Berkeley, CA (US); Michael P. O'Neill, Kaneohe, HI (US)

(73) Assignee: TruTag Technologies, Inc., Kapolei, HI (US)

( * ) Notice: Subject to any disclaimer, the term of this patent is extended or adjusted under 35 U.S.C. 154(b) by 0 days.

(21) Appl. No.: 16/230,959

(22) Filed: Dec. 21, 2018

(65) Prior Publication Data

US 2019/0167521 A1 Jun. 6, 2019

Related U.S. Application Data

(63) Continuation of application No. 14/692,588, filed on Apr. 21, 2015, now Pat. No. 10,195,109, which is a (Continued)

(51) Int. Cl.
*A61J 1/14* (2006.01)
*B65C 3/06* (2006.01)
(Continued)

(52) U.S. Cl.
CPC . *A61J 1/14* (2013.01); *A61J 1/03* (2013.01); *B65C 3/06* (2013.01); *G06Q 10/08* (2013.01)

(58) Field of Classification Search
CPC ....... G06F 19/3462; A61J 7/0084; A61J 1/14; A61J 1/03; G07F 17/0092; B65C 3/06;
(Continued)

(56) References Cited

U.S. PATENT DOCUMENTS 7,364,072 B1 4/2008 Moore
7,566,007 B2 7/2009 Aoki
(Continued)

FOREIGN PATENT DOCUMENTS

CN 1131463 9/1996
CN 1163399 10/1997
(Continued)

OTHER PUBLICATIONS

Ni Xingyuan, "Physical and Chemical Properties of Nano Materials and its Application", Jan. 31, 2006, pp. 212-214.
Xu Chuanlai,"Food Immunology", Aug. 31, 2007, pp. 245-246.

*Primary Examiner* — Thien M Le
*Assistant Examiner* — Tae W Kim
(74) *Attorney, Agent, or Firm* — Van Pelt, Yi & James LLP

(57) ABSTRACT

A system for packaging an item with an identifier comprises an identifier adder, a labeler, and a packager. The identifier adder adds one or more types of silica-based tags to an item, wherein each type of silica-based tag has a first signature readable using an optical spectroscopic reader. A label is generated based at least in part on reading the one or more types of silica-based tags of the item using the optical spectroscopic reader. The label includes goods info. The packager includes the label on a package, and wherein the packager includes the item in the package.

12 Claims, 8 Drawing Sheets

Related U.S. Application Data continuation of application No. 13/158,252, filed on Jun. 10, 2011, now Pat. No. 9,033,213.

(60) Provisional application No. 61/354,637, filed on Jun. 14, 2010.

(51) Int. Cl.
*A61J 1/03* (2006.01)
*G06Q 10/08* (2012.01)

(58) Field of Classification Search
CPC .... G06Q 10/08; G06Q 30/0185; B65B 61/20; B65B 61/202; B65B 61/26
USPC .......................................................... 235/375
See application file for complete search history.

(56) References Cited

U.S. PATENT DOCUMENTS

| | | | |
|---|---|---|---|
| 7,606,831 | B2 | 10/2009 | Quinn |
| 2003/0062422 | A1 | 4/2003 | Fateley |
| 2003/0136837 | A1 | 7/2003 | Amon |
| 2005/0017082 | A1 | 1/2005 | Moran |
| 2005/0042764 | A1 | 2/2005 | Sailor |
| 2005/0143249 | A1 | 6/2005 | Ross |
| 2006/0086791 | A1* | 4/2006 | Austin ............. G06K 19/06037 235/385 |
| 2006/0251562 | A1* | 11/2006 | Farrell et al. ................ 423/324 |
| 2007/0234058 | A1 | 10/2007 | White |
| 2008/0093448 | A1 | 4/2008 | de la Huerga |
| 2008/0177568 | A1* | 7/2008 | Kotidis .............................. 705/2 |
| 2009/0050694 | A1* | 2/2009 | Radatti et al. ................ 235/381 |
| 2009/0075261 | A1* | 3/2009 | Hayward et al. ................ 435/6 |
| 2009/0309733 | A1 | 12/2009 | Moran |
| 2010/0267245 | A1 | 10/2010 | Kamian |
| 2010/0279494 | A1 | 11/2010 | Wang |
| 2010/0294333 | A1 | 11/2010 | Wang |
| 2010/0294356 | A1 | 11/2010 | Parikh |
| 2010/0300518 | A1 | 12/2010 | Moslehi |
| 2010/0304521 | A1 | 12/2010 | Seutter |
| 2010/0304522 | A1 | 12/2010 | Rana |
| 2011/0014742 | A1 | 1/2011 | Parikh |
| 2011/0030610 | A1 | 2/2011 | Kamian |
| 2011/0084813 | A1* | 4/2011 | Mullin ................... G06Q 10/06 340/10.4 |

FOREIGN PATENT DOCUMENTS

| | | |
|---|---|---|
| CN | 101479629 | 7/2009 |
| CN | 101563640 | 10/2009 |
| CN | 101283266 | 1/2012 |
| JP | 2003531734 | 10/2003 |
| JP | 200417999 | 1/2004 |
| JP | 2008279060 | 11/2008 |
| WO | 0178288 | 10/2001 |
| WO | 2005031302 | 4/2005 |
| WO | 2007021971 | 2/2007 |

* cited by examiner

SYSTEM FOR PRODUCING A PACKAGED ITEM WITH AN IDENTIFIER

CROSS REFERENCE TO OTHER APPLICATIONS

This application is a continuation of U.S. patent application Ser. No. 14/692,588, entitled SYSTEM FOR PRODUCING A PACKAGED ITEM WITH AN IDENTIFIER filed Apr. 21, 2015 which is incorporated herein by reference for all purposes, which is a continuation of U.S. patent application Ser. No. 13/158,252, now U.S. Pat. No. 9,033,213, entitled SYSTEM FOR PRODUCING A PACKAGED ITEM WITH AN IDENTIFIER filed Jun. 10, 2011 which is incorporated herein by reference for all purposes, which claims priority to U.S. Provisional Application No. 61/354,637, entitled SYSTEM FOR PRODUCING A PACKAGED ITEM WITH AN IDENTIFIER filed Jun. 14, 2010 which is incorporated herein by reference for all purposes.

BACKGROUND OF THE INVENTION

A producer or reseller of items (including ingredients and components of such items)—for example a manufacturer, but also including other parties in the entire supply and distribution chain such as a supplier, a wholesaler, a distributor, a repackager, and a retailer—especially, but not limited to, high-value items, faces counterfeiting of the item. Counterfeiting includes the substitution, dilution, addition or omission of ingredients or components of the item compared to its intended product specification, as well as misrepresentation or diversion of the packaged item from its intended course of sale. This leads to loss of potential revenue as counterfeit items are sold in the place of the real item. Also, there can be health or product related damages caused by not using an authentic item as opposed to a counterfeit—for example, the counterfeit can perform differently or not at all as compared to an authentic item. This is particularly acute in industries that can affect health and safety such as industries involved with pharmaceuticals, nutritional supplements, medical devices, food and beverages, construction, transportation, and defense.

As international criminal organizations become more sophisticated, existing packaging security is proving inadequate. The complexity of many industry supply chains—for example, the supply chain of the pharmaceutical industry—lends itself to entry points for adulterated or counterfeit product(s), often found in carefully counterfeited and high-quality packaging, and sometimes in authentic packaging that has either been stolen or as part of a repackaging operation.

In complex product supply chains and markets with variable pricing, opportunities for arbitrage exist for unscrupulous parties to misrepresent product pricing without any change to the underlying product, and thus benefit monetarily, for example, as in returns, rebate or charge-back fraud. Monetary gain or loss to either side of a transaction may also result from errors in record-keeping.

In addition to counterfeiting or product misrepresentation, items that appear physically identical or similar, for example certain nutritional supplements, may actually contain different ingredients or components, but because of similar appearance may be unintentionally packaged or labeled incorrectly. Even if the items are otherwise identical, they may have different properties associated with the particular lot or batch conditions; for example, pharmaceuticals that otherwise appear identical may have different expiration dates and be incorrectly labeled due to failures or limitations in quality assurance protocols to ascertain such differences.

For product development and research, it may be beneficial at times to study and authenticate performance of items that appear identical but are made differently to learn whether or how those differences affect an end use. At times, it is important in such studies—for example in clinically masked (or 'blind') studies leading to pharmaceutical development—to be able to confidently identify the underlying item without revealing the true identity to study participants. In the case of pharmaceutical development and clinical trials, item-level identity error may be introduced, for example, at the contract research organization that repackages the various product formulations into masked unit-doses. Much time, cost, and effort goes into statistical sampling and chemical analyses to verify the true identity of the unit-doses that are ultimately administered.

In the effort to attain positive health outcomes in a more cost-effective and timely manner, healthcare providers need to focus on the adherence to health regimens, not just the efficacy of specific drugs. Understanding when, where and how often medicine is prescribed by a doctor, accurately and timely dispensed from a pharmacy, received by a patient, and consumed by the patient is helpful in understanding and verifying the effectiveness of the overall health regimen. Recording and collecting the data for appropriate analysis and study while also being able to confirm the underlying identity of the medicine at each stage is important to the reliability of the information collected.

BRIEF DESCRIPTION OF THE DRAWINGS

Various embodiments of the invention are disclosed in the following detailed description and the accompanying drawings.

DETAILED DESCRIPTION

Figure 1:
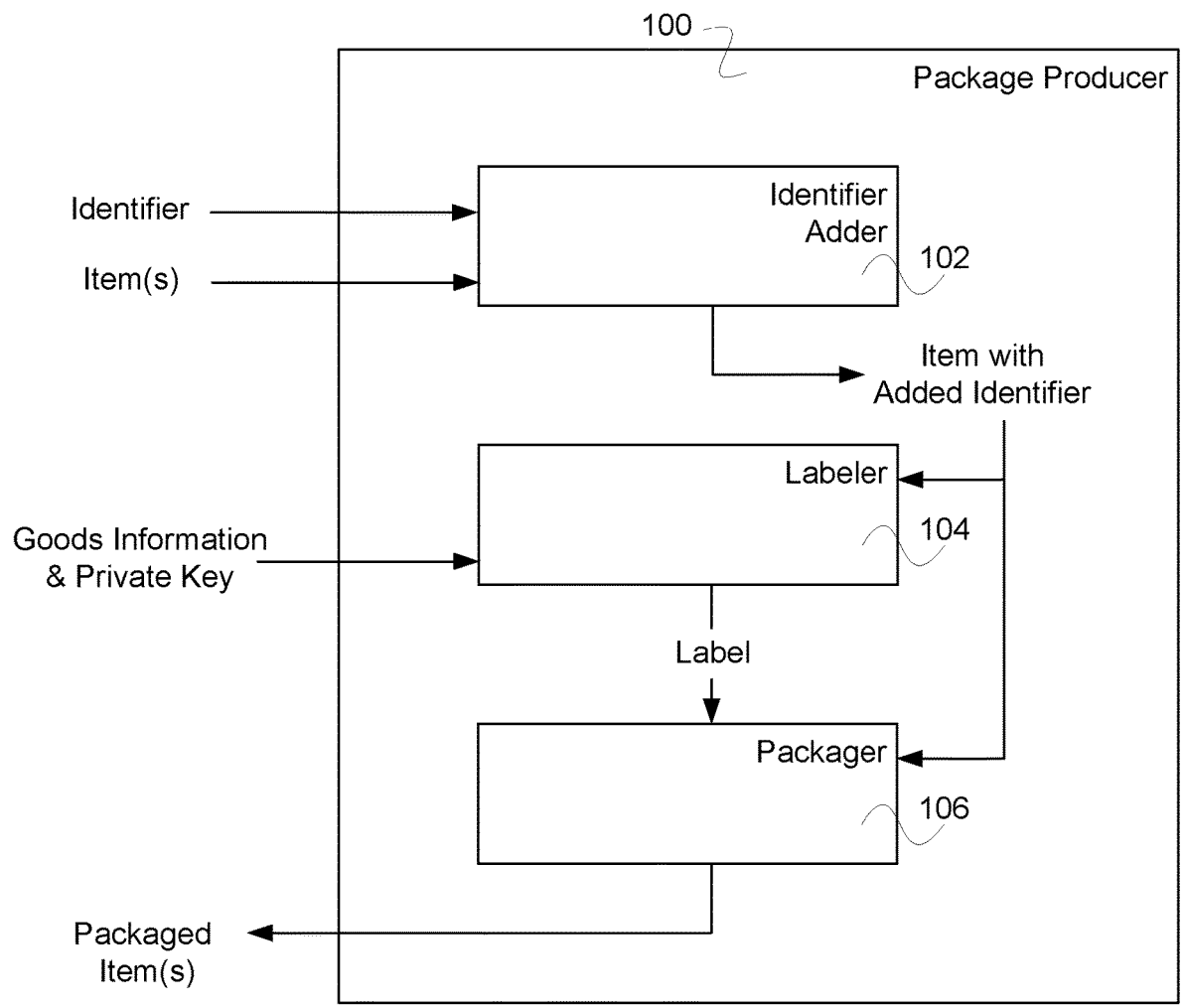
FIG. 1 is a block diagram illustrating an embodiment of a package producer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for producing a packaged item with an identifier is disclosed. The package includes one or more items each with an associated one or more selected tag identifiers that are placed in a location on the item. A verifier later verifies the one or more items using 1) the associated one or more selected tag identifiers as detected using a spectral measurement, 2) the location and/or shape of the tag identifiers on the item as detected using an imager, and 3a) the label as read using a label reader.

In various embodiments, the package contains individually identified items, the package contains one type of item identified with an identifier for the one type of item, or any other appropriate mapping of identifier(s) and/or item type, or any appropriate item or type of item. For example, each item (e.g., an individual art piece) has an individually identifiable set of tags or each type of item (e.g., all art pieces of a series of art pieces, a series of lithographic reproductions, etc.) has the same tag. So, that either each individual item is identifiable because it has a different tag, or all the items of the same type have the same tag so that the items of the type cannot individually be told apart but instead can be differentiated from other types of items (e.g., vitamin C tablets as opposed to vitamin D, or a low-dose type of medicine opposed to its higher-dose counterpart, etc.).

In various embodiments, a label or database entry associated with each item comprises information about the packaged items (hereby denoted goods information or goods info) that is useful to authenticate with the item. For example, goods info for medicines may contain dosage information, expiration dates, lot numbers, etc. Goods information may comprise different types of information depending on the associated item—for example, ingredient(s), stock keeping unit (SKU) number, identifier, physical characteristics (e.g., weight, dimension, volume, etc.), and nutrition information, etc.

In various embodiments, the package comprises a pharmaceutical package that includes one or more pills, liquids, test strips, transdermal patches or any other appropriate medicines or medical devices. The medicines have an added tag identifier that is added into the outer coating, is distributed on the outer layer of an uncoated medicine (e.g., a pill), is distributed throughout a pill or liquid, or any other appropriate manner of adding a tag identifier. In various embodiments, the package comprises an item—for example, an electronic chip, sub-component, medical devices, an automobile or airplane part, building or material supplies, clothing, toys, cosmetics, jewelry, watches, works of art, currency, tickets, official identification documents, wine, or gourmet food. In some embodiments, the tag comprises a rugate filter. In some embodiments, the physical placement is used for identification—for example, the tags are laid out in a pattern (e.g., geometric shape, bar code, etc.) that is detectable using an imaging device. In some embodiments, the shapes of the tags are characterized and the characterization is used for identification. In some embodiments, individual tag placement is partially variable due to inclusion of a random or pseudorandom step in the tag placement process, allowing unique or nearly unique tag placement for each cluster of tags.

In various embodiments, the package comprises a pharmaceutical package that includes one or more solid oral dosage forms (SODFs: e.g., tablets, capsules, caplets, powders, crystals, and thin films), liquids (e.g. creams, gels, liniments, balms, lotions, injectables, and ointments), and/or any other appropriate medicines. The medicines have an added tag identifier that is added into the outer coating, is distributed on the outer layer of an uncoated medicine (e.g., an SODF), is distributed throughout an SODF or liquid, or any other appropriate manner of adding a tag identifier. In various embodiments, the package comprises a manufactured item—for example, an electronic chip. In some embodiments, the tag comprises a rugate filter. In some embodiments, the physical placement is used for identification—for example, the tags are laid out in a shape (e.g., a circle, a square, etc.) or pattern (e.g., checkerboard, bar code, etc.) that is detectable using an imaging device. In some embodiments, the shape or shapes of one or more than one of the tags themselves are characterized and the characterization is used for identification. In some embodiments, individual tag placement is partially variable due to inclusion of a random or pseudorandom step in the tag placement process, allowing unique or nearly unique tag placement for each cluster of tags. In some embodiments, the verifier measures the location of one or more tags on an item or label, and from the tag locations and/or shapes produces a signature by means of an algorithm. In some embodiments, the algorithm uses the relative arrangement and/or shape of multiple tags with or without a fiduciary mark to produce a single item signature. In some embodiments, the algorithm produces a signature from the location and/or shape of each tag, and then combines the signatures from more than one tag on an item into a single signature. In some embodiments, the algorithm produces multiple signatures derived from the location and/or shape of one or more tags. In some embodiments, the verifier produces a single signature from the location and/or shape of one or more tags. For example, the use of a tag shape or combination of tag shapes, the placement of one or more tags in a pattern or arrangement or the relative locations of the one or more tags, or the spectral signature of a tag or of more than one tag are used alone or in combination to determine whether or not an item marked with the tag(s) is the authentic item. In some embodiments, different shapes of the tags are produced using ultrasonic agitation.

In some embodiments, tags are made of the silica (deemed "generally recognized as safe"—or GRAS—by the Food and Drug Administration), rendering them biologically inert and edible. Each barely visible tag contains a custom-manufactured spectral signature chosen from over one billion possibilities, yet each item costs only fractions of a penny to label. The unique optical signature of each tag can be read by a low cost scanner and be linked to a label in a secure database, where additional information about the item can be stored, such as referencing a future e-pedigree track-and-trace system. Tags comprise a silicon wafer that is etched to have a spectral code encoded by the etching. The wafer is divided into small tags, and the resultant tags contain a complex porous nanostructure that is programmed during electrochemical synthesis to display a unique reflectivity spectrum. The tags are then oxidized by a high-temperature bake step to turn the crystalline, nanoporous silicon tags into amorphous, nanoporous silica. This bake step stabilizes the nanoporous structure against further oxidation (thus stabilizing the spectral signature) and provides for the tags to be characterized as a GRAS excipient. The spectrum is measured via a simple, low-cost spectrometer-based reader, then quickly verified against other information printed on the package, such that the medicine and packaging are authenticated together; tampering with either the package, or the contents, would flag a security violation. In some embodiments, the information stored in the tag reflectivity spectrum is combined with information about tag shape or placement for additional security. The tags can also be used on their own acting simply as labels for quality assurance or other purposes. Information capacity is projected to potentially reach one trillion possible unique spectra, using peak number, peak placement, peak rugate phase, and/or peak amplitude as modulation parameters. The tags are passive, inconspicuous and can be attached to the outside of medicines or food products to be read, for example, through clear or translucent plastic blister packs, or mixed into medicines or food as a forensic excipient, to be read as part of an investigation or inspection process by authorized security or quality assurance personnel.

In some embodiments, the tag properties comprise:

More than one billion codes available

Inconspicuous size range (20 μm to 150 μm) allows covert or semi-covert use

Made from clear, high purity silica rendering them biologically inert and edible High temperature resistance—melting point above 1600° C.

Passive—no energy input or output

Can be used in or on a product, package, label, or security fiber

Can be applied via sprays, coatings, inks, varnishes, or as part of laminate

Can be integrated at a number of manufacturing stages

High level of security possible using random tag shapes; security can be scaled to suit specific product needs Can be made self-authenticating and reduce the costs and security risks associated with online databases and maintenance Each piece of the silica microtag contains the coded information, useful for forensics In some embodiments, a system for packaging an item with an identifier comprises an identifier adder, a labeler, and a packager. The identifier adder adds one or more types of silica-based tags to an item, wherein each type of silica-based tag has a first signature readable using an optical spectroscopic reader. A label is generated based at least in part on reading the one or more types of silica-based tags of the item using the optical spectroscopic reader. The label includes goods info. The packager includes the label on a package, and wherein the packager includes the item in the package. In some embodiments, each type of silica-based tag has a second signature readable using an optical imaging reader. In various embodiments, one of the one or more types of silica tags are selected for one or more of the following: a shape, having a characterization associated with a number, a placement in a spatial arrangement, characterization by imaging a shape of one of the one or more types of silica tags, or characterization by imaging a plurality of the one or more types of silica tags with or without a fiducial visible in a field of view, or any other selection criteria. In some embodiments, the one or more types of randomly-shaped silica tags are produced using ultrasonic agitation. In various embodiments, the item comprises a solid dosage form or a liquid, or any other appropriate item. In various embodiments, the solid oral dosage form comprises one of the following: a tablet, a capsule, a caplet, a powder, a crystal, or a thin film, or any other appropriate form. In various embodiments, the liquid comprises one of the following: a cream, a gel, a liniment, a balm, a lotion, an injectable, or an ointment, or any other appropriate liquid.

In some embodiments, a package of items comprises one or more items and a label. One or more types of silica-based tags are added to the one or more items, wherein each type of silica-based tags has a signature readable using an optical spectroscopic reader. The label is generated based at least in part on reading the one or more types of silica-based tags. In some embodiments, the one of the one or more items comprises a solid oral dosage form or a liquid, or any other appropriate item. In various embodiments, the solid oral dosage form comprises one of the following: a tablet, a capsule, a caplet, a powder, a crystal, or a thin film, or any other appropriate form. In various embodiments, the liquid comprises one of the following: a cream, a gel, a liniment, a balm, a lotion, an injectable, or an ointment, or any other appropriate liquid.

In some embodiments, a system for packaging a type of item with an identifier comprises an encoder, a tag producer, and an identifier adder. The encoder determines one or more identifiers for a type of item. The tag producer produces one or more types of silica-based tags, wherein the one or more types of silica-based tags are determined based at least in part on the one or more identifiers. The one or more types of silica-based tags are added to the item. In various embodiments, one of the one or more types of silica tags are selected for one or more of the following: a shape, having a characterization associated with a number, a placement in a spatial arrangement, characterization by imaging a shape of one of the one or more types of silica tags, or characterization by imaging a plurality of the one or more types of silica tags with or without a fiducial visible in a field of view, or any other selection criteria. In some embodiments, the one or more types of randomly-shaped silica tags are produced using ultrasonic agitation. In various embodiments, the item comprises a solid dosage form or a liquid, or any other appropriate item. In various embodiments, the solid oral dosage form comprises one of the following: a tablet, a capsule, a caplet, a powder, a crystal, or a thin film, or any other appropriate form. In various embodiments, the liquid comprises one of the following: a cream, a gel, a liniment, a balm, a lotion, an injectable, or an ointment, or any other appropriate liquid.

In some embodiments, an item with an identifier comprises one or more types of silica-based tags are added to the SODF or the liquid, wherein each type of silica-based tags has a signature readable using an optical spectroscopic reader. In some embodiments, each type of silica-based tag has a second signature readable using an optical imaging reader. In various embodiments, one of the one or more types of silica tags are selected for one or more of the following: a shape, having a characterization associated with a number, a placement in a spatial arrangement, characterization by imaging a shape of one of the one or more types of silica tags, or characterization by imaging a plurality of the one or more types of silica tags with or without a fiducial visible in a field of view, or any other selection criteria. In some embodiments, the one or more types of randomly-shaped silica tags are produced using ultrasonic agitation. In various embodiments, the item comprises a solid dosage form or a liquid, or any other appropriate item. In various embodiments, the solid oral dosage form comprises one of the following: a tablet, a capsule, a caplet, a powder, a crystal, or a thin film, or any other appropriate form. In various embodiments, the liquid comprises one of the following: a cream, a gel, a liniment, a balm, a lotion, an injectable, or an ointment, or any other appropriate liquid.

FIG. 1 is a block diagram illustrating an embodiment of a package producer. In the example shown, package producer 100 comprises identifier adder 102, labeler 104, and packager 106. Identifier adder 102 receives an identifier (e.g., tag(s)) and item(s) and adds the identifier to the item(s). The item with identifier is measured by labeler 104 for spectral information from the tag, placement information of the tag on the item (e.g., in a pattern, in a code, forming a shape, etc.), and tag shape and/or characteristic information. Labeler 104, based on the information detected from the items and key and/or goods information, generates a label for a package for the item. Label is added to the package using packager 106.

Figure 2:
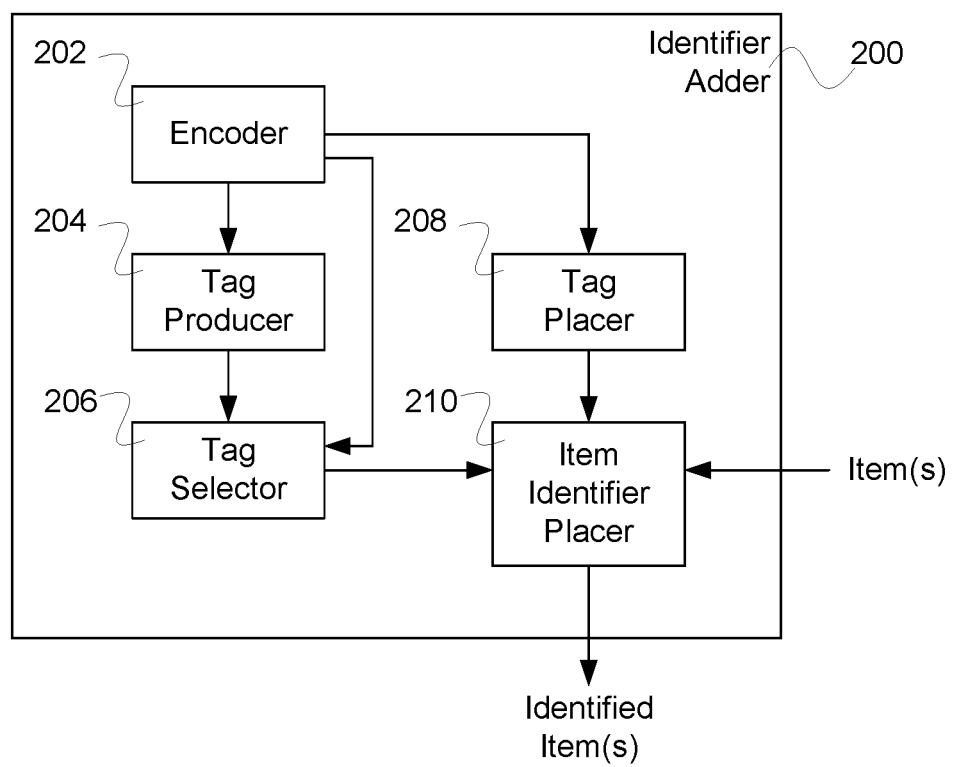
FIG. 2 is a block diagram illustrating an embodiment of an identifier adder.

FIG. 2 is a block diagram illustrating an embodiment of an identifier adder. In some embodiments, identifier adder 200 is used to implement identifier adder 102 of FIG. 1. In the example shown, identifier adder 200 comprises encoder 202, tag producer 204, tag selector 206, tag placer 208, and item identifier placer 210. Item identifier adder 200 adds an item identifier (e.g., one or more tags) to an item. Encoder 202 determines a code that is used to generate tag(s) for an item. For example, a code indicates the reflectance peaks of a particular amplitude or a particular phase or other particular property for a rugate tag. Tag producer 204 produces tag(s) based at least in part on the code provided by encoder 202. Tag selector 206 selects one or more tags produced by tag producer 204 also based at least in part on the code provided by encoder 202. For example, the code indicates appropriate tag(s) for the identifier for the item, and tag selector 206 selects tags with correct codes, tags with correct shapes, tags with appropriate reflectivity peaks, tags with appropriate reflectivity amplitudes, tags with appropriate properties, or any other appropriate selection criterion. In one embodiment, tag placer 208 indicates a placement for tags on the item based at least in part on the code determined by encoder 202. In one embodiment, tag placer 208 indicates a placement of tags at least in part independent of any controlling parameter. Item identifier placer 210 places tag(s) selected by tag selector 206 on item(s) according to the indication by tag placer 208.

Figure 3:
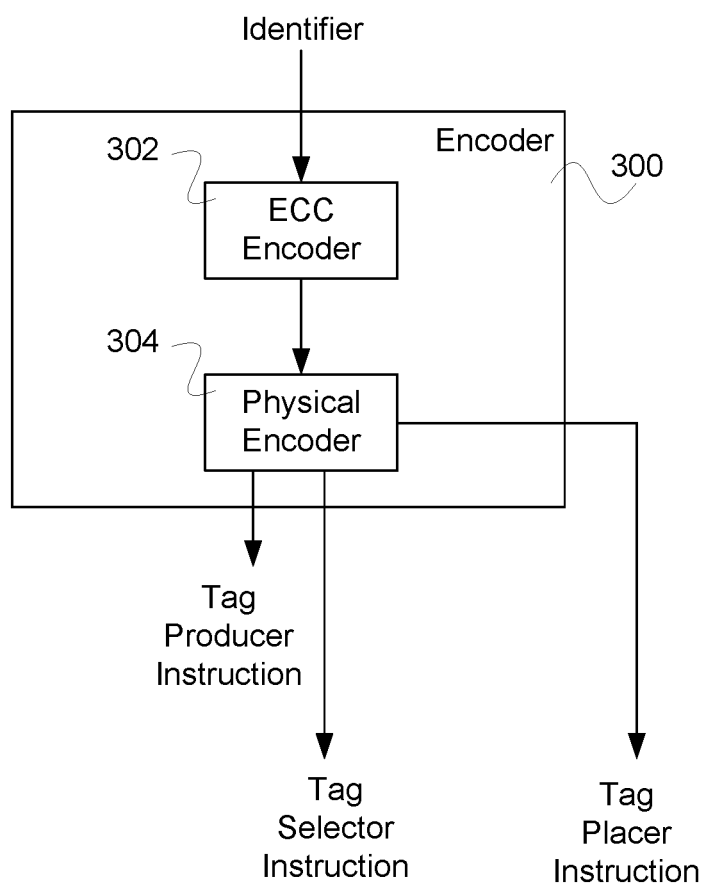
FIG. 3 is a block diagram illustrating an embodiment of an encoder.

FIG. 3 is a block diagram illustrating an embodiment of an encoder. In some embodiments, encoder 300 is used to implement encoder 202 of FIG. 2. In the example shown, encoder 300 comprises ECC encoder 302 and physical encoder 304. Encoder 300 takes an input of an identifier and determines tag producer instruction(s), tag selector instruction(s), and tag placer instruction(s). ECC encoder 302 receives identifier and adds error correction coding (ECC) encoding so that identifier, when read, can be corrected in the event of some errors in the reading process. The identifier and ECC numbers (e.g., bits and bytes) are encoded in physical properties of a tag, a selection of a tag, or a tag location (e.g., reflectivity peak locations, peak amplitudes, selection criteria for the tags, and location indications) by physical encoder 304.

Figure 4:
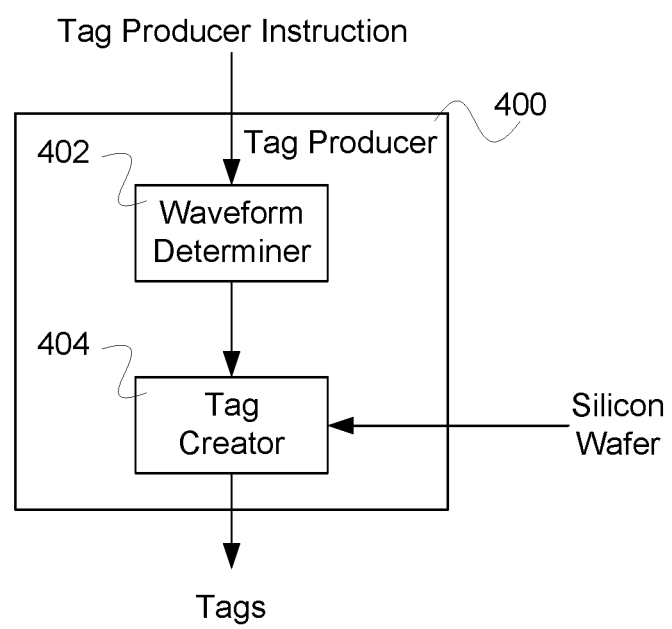
FIG. 4 is a block diagram illustrating an embodiment of a tag producer.

FIG. 4 is a block diagram illustrating an embodiment of a tag producer. In some embodiments, tag producer 400 is used to implement tag producer 204 of FIG. 2. In the example shown, tag producer 400 comprises waveform determiner 402 and tag creator 404. Waveform determiner 402 determines a waveform used in generating tags using tag producer instruction (e.g., indication generated by an encoder). For example, sine waves with different frequencies are added together to generate a composite waveform that is used in the etching of a porosity-depth profile in a silicon (Si) wafer. The waveforms (e.g., describing a current-time wave) are encoded in the porosity of a silicon microtag. The silicon microtag, after etching the encoded waveform, is converted to silicon dioxide ($SiO_2$) by thermal oxidization (e.g., by heating to 900-1000° C.). Tag creator 404 uses waveform determined by waveform determiner 402 to generate tags from input silicon wafer(s).

Figure 5:
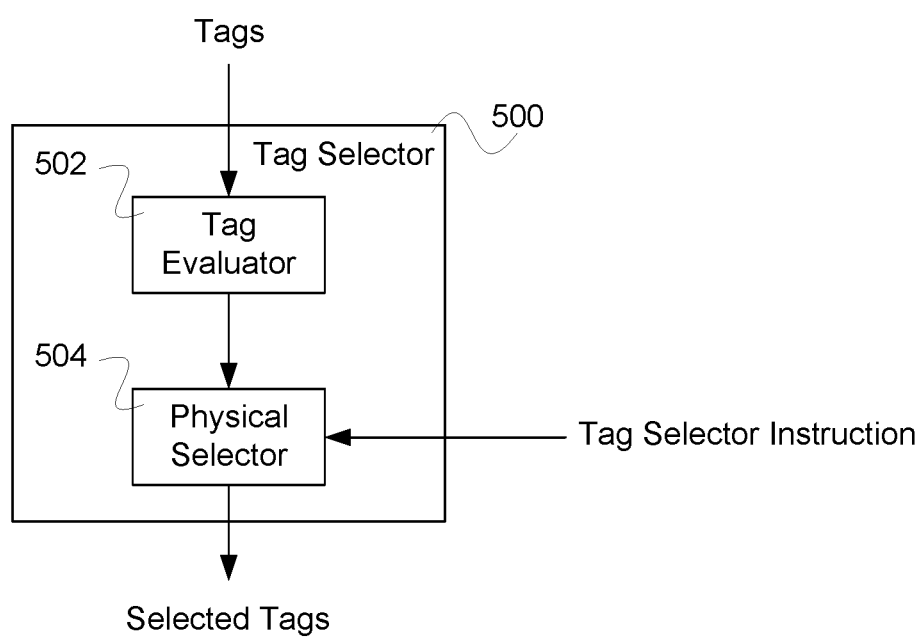
FIG. 5 is a block diagram illustrating an embodiment of a tag selector.

FIG. 5 is a block diagram illustrating an embodiment of a tag selector. In some embodiments, tag selector 500 is used to implement tag selector 206 of FIG. 2. In the example shown, tag selector 500 comprises tag evaluator 502 and physical selector 504. Tag selector 500 receives tags (e.g., tags produced by a tag producer) and tag selector instructions (e.g., indications from an encoder) and evaluates and selects tags. Tag evaluator 502 evaluates incoming tags and passes tags and evaluations to physical selector 504 based at least in part on tag selector instructions to determine selected tags.

Figure 6:
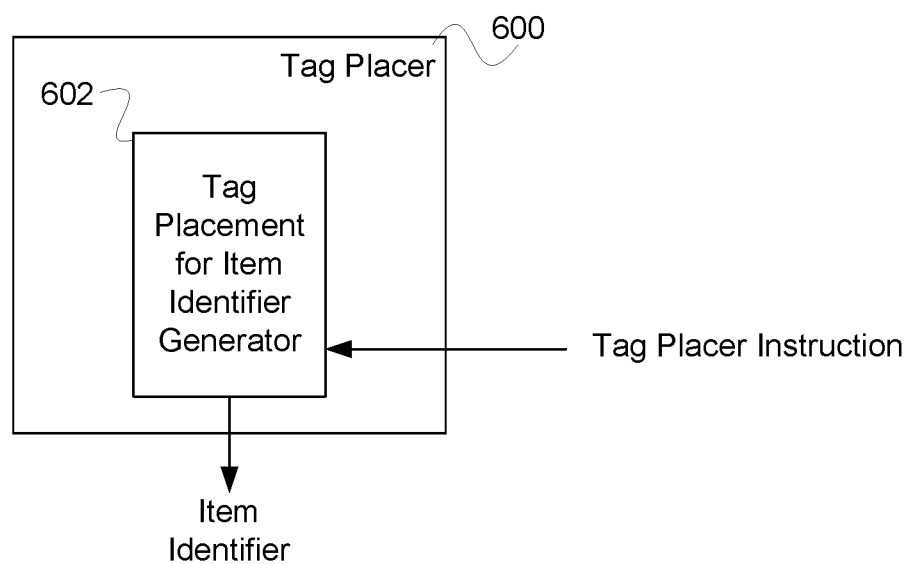
FIG. 6 is a block diagram illustrating an embodiment of a tag placer.

FIG. 6 is a block diagram illustrating an embodiment of a tag placer. In some embodiments, tag placer 600 is used to implement tag placer 208 of FIG. 2. In the example shown, tag placer 600 comprises tag placement for item identifier generator 602. Tag placer 600 receives tag placer instructions (e.g., from an encoder) and provides an indication to an item identifier to place a tag on an item. For example, tags are placed on an SODF surface in a geometric pattern, a bar code pattern, or a series of alphanumeric characters.

Figure 7A:
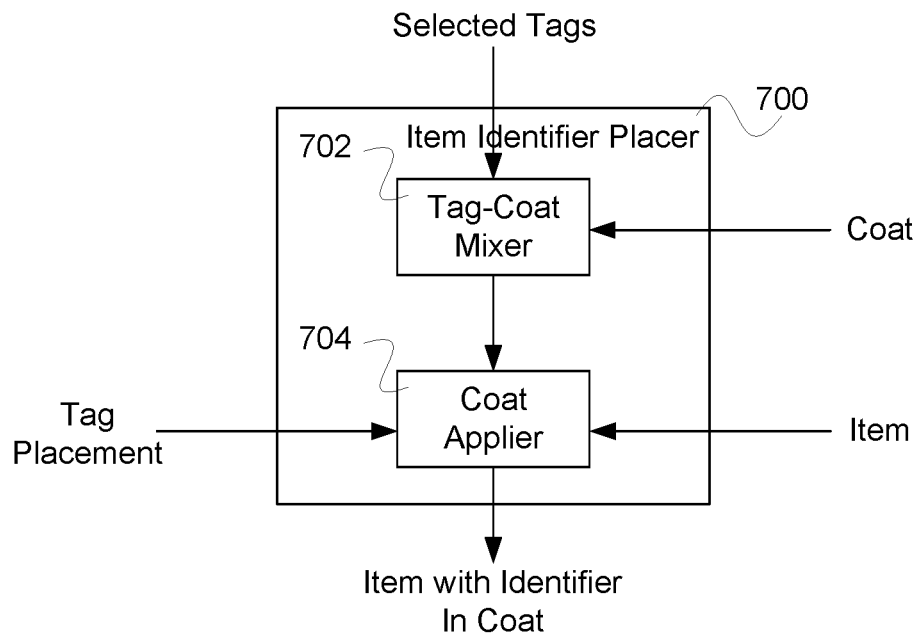
FIG. 7A is a block diagram illustrating an embodiment of an item identifier placer.

FIG. 7A is a block diagram illustrating an embodiment of an item identifier placer. In some embodiments, item identifier placer 700 comprises tag-coat mixer 702 and coat applier 704. Item identifier placer 700 receives input coat and tag placement indication and places selected tags in a coating of an item. Tag-coat mixer 702 receives selected tags (e.g., from tag selector) and mixes the selected tags and the coat. Coat applier 704 receives indication of tag placement and places tag-coat mixture appropriately on item(s).

Figure 7B:
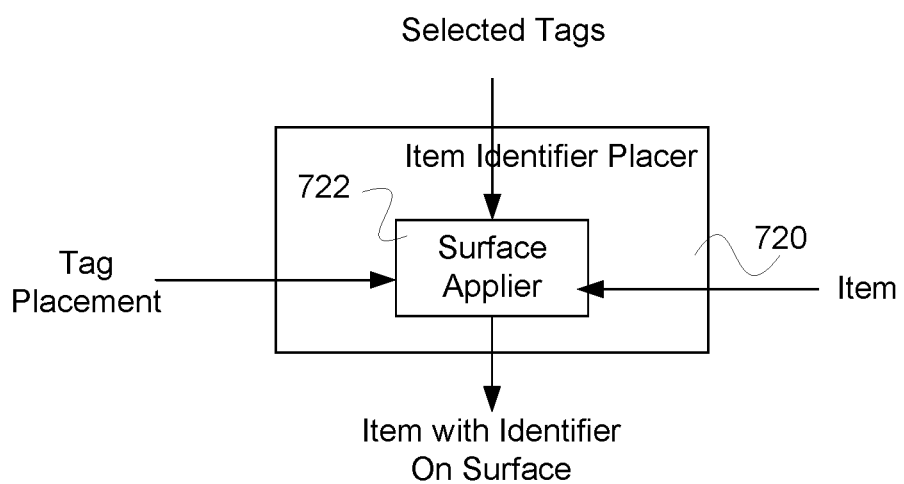
FIG. 7B is a block diagram illustrating an embodiment of an item identifier placer.

FIG. 7B is a block diagram illustrating an embodiment of an item identifier placer. In some embodiments, item identifier placer 720 comprises surface applier 722. Item identifier placer 720 receives tag placement indication and places selected tags on a surface of an item. Surface applier 722 receives indication of tag placement and places selected tags in a pattern—for example, geometric pattern or alphanumeric pattern, on the surface of the item.

Figure 7C:
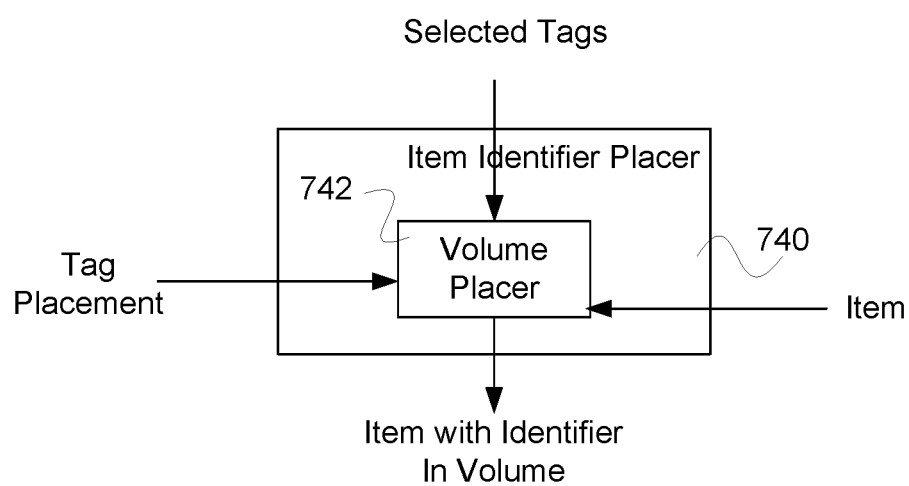
FIG. 7C is a block diagram illustrating an embodiment of an item identifier placer.

FIG. 7C is a block diagram illustrating an embodiment of an item identifier placer. In some embodiments, item identifier placer 740 comprises volume placer 742. Item identifier placer 740 receives tag placement indication and places selected tags in a volume of an item. Volume placer 742 receives indication of tag placement and places selected tags in a pattern or in a volume—for example, suspended in a liquid or distributed homogenously or inhomogeneously within an SODF—of the item.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for packaging an item with an identifier, comprising:
   an identifier adder, wherein the identifier adder adds a plurality of tags to an item based on a tag placement indication, wherein a tag of the plurality of tags comprises a rugate filter, wherein the plurality of tags has a signature readable using an optical reader, wherein the signature includes a spectral signature, and wherein the identifier adder includes a tag-coat mixer configured to make a tag-coat mixture comprising the plurality of tags and a coat and a coat applier configured to place the tag-coat mixture on the item;
   a labeler, wherein the labeler measures the item to detect spectral information and placement information of the plurality of tags on the item, and wherein the labeler generates a label based at least in part on the spectral information and the placement information detected from the item, and wherein the label includes goods info; and
   a packager, wherein the packager adds the label on a package for the item.

2. A system as in claim 1, wherein the signature is a first signature and the optical reader is a first optical reader, wherein the plurality of tags has a second signature readable using a second optical reader, and wherein plurality of tags are selected for a placement in a spatial arrangement of the plurality of tags.

3. A system as in claim 1, wherein the plurality of tags has one or more of the following: a shape characterization, a number characterization, an imaging shape characterization derived by imaging a shape of the plurality of tags, or an imaging shape with fiducial characterization derived by imaging a plurality of the tags with a fiducial visible in a field of view.

4. A system as in claim 1, wherein the plurality of tags are produced using ultrasonic agitation.

5. A system as in claim 1, wherein the item comprises a solid oral dosage form.

6. A system as in claim 5, wherein the solid oral dosage form comprises one of the following: a tablet, a capsule, a caplet, a powder, a crystal, or a thin film.

7. A package of items, comprising:
   one or more items, wherein a plurality of tags are added to the one or more items based on a tag placement indication, wherein a tag of the plurality of tags comprises a rugate filter, wherein the plurality of tags has a signature readable using an optical reader, and wherein the signature includes a spectral signature, wherein the plurality of tags and a coat are mixed to generate a tag-coat mixture, wherein the tag-coat mixture is placed on each of the one or more items, wherein the tag-coat mixture is placed using a coat applier, and wherein the coat applier is configured to place the tag-coat mixture on the one or more items; and
   a label, wherein the item is measured to detect spectral information and a placement information of the plurality of tags on the item, wherein the label is generated based at least in part on the spectral information and the placement information detected from the item, and wherein the label includes goods info.

8. A package as in claim 7, wherein the optical reader is a first optical reader, wherein the plurality of tags has a second signature readable using a second optical reader, wherein the plurality of tags are selected for a placement in a spatial arrangement of the plurality of tags.

9. A package as in claim 7, wherein one of the one or more items comprises a solid oral dosage form.

10. A package as in claim 9, wherein the solid oral dosage form comprises one of the following: a tablet, a capsule, a caplet, a powder, a crystal, or a thin film.

11. A package as in claim 7, wherein an item of the one or more items corresponds to the label added to another item.

12. A package as in claim 11, wherein the label is not generated based on reading the one or more types of silica-based tags.

* * * * *

UNITED STATES PATENT AND TRADEMARK OFFICE
CERTIFICATE OF CORRECTION

PATENT NO. : 11,166,874 B2
APPLICATION NO. : 16/230959
DATED : November 9, 2021
INVENTOR(S) : Peter Pearson et al.

It is certified that error appears in the above-identified patent and that said Letters Patent is hereby corrected as shown below:

In the Specification

In Column 3, Line(s) 31, after "and", delete "3a)" and insert --3)--, therefor.

Signed and Sealed this
Fourteenth Day of June, 2022

Katherine Kelly Vidal
*Director of the United States Patent and Trademark Office*